United States Patent [19]

Benczur-Urmossy

[11] 3,926,844

[45] Dec. 16, 1975

[54] CATALYSTS FOR THE CATHODIC HYDROGEN DEVELOPMENT

[75] Inventor: Gabor Benczur-Urmossy, Stuttgart, Germany

[73] Assignee: Deutsche Automobilgesellschaft mbH, Hannover, Germany

[22] Filed: Feb. 19, 1974

[21] Appl. No.: 443,195

[30] Foreign Application Priority Data

Feb. 17, 1973 Germany............................ 2307852

[52] U.S. Cl................................. 252/432; 204/1 R
[51] Int. Cl.²........................................... B01J 21/02
[58] Field of Search...................... 252/432; 204/1 R

[56] References Cited
UNITED STATES PATENTS

| | | | |
|---|---|---|---|
| 3,210,157 | 10/1965 | Lewis et al...................... | 252/432 X |
| 3,322,686 | 5/1967 | Brown et al. ...................... | 252/432 |

OTHER PUBLICATIONS

Takegami et al., Chem. Ab. 65 16884C (1966).

Takegami et al., J. Chem. Soc. Japan, Ind. Chem. Sect., 68 Pages 2373–2379 79 (1965).

Primary Examiner—Patrick P. Garvin
Attorney, Agent, or Firm—Craig & Antonelli

[57] ABSTRACT

A process for the production of catalysts for the cathodic hydrogen evolution in alkaline electrolytes, which comprises depositing at least one X-ray-amorphous boride compound of nickel, cobalt or iron on a supporting structure. The compound is deposited from an aqueous solution containing metallic ions such as nickel ions, cobalt ions, or iron ions, a complexing agent for the metallic ions and a water-soluble boranate or borazane (also known as aminoborane) at a temperature of below 60°C. The solution has a concentration of free metallic ions i.e., nickel, cobalt or iron ions, of below $10^{-10}$ mole/liter after addition of the complexing agent.

19 Claims, 1 Drawing Figure

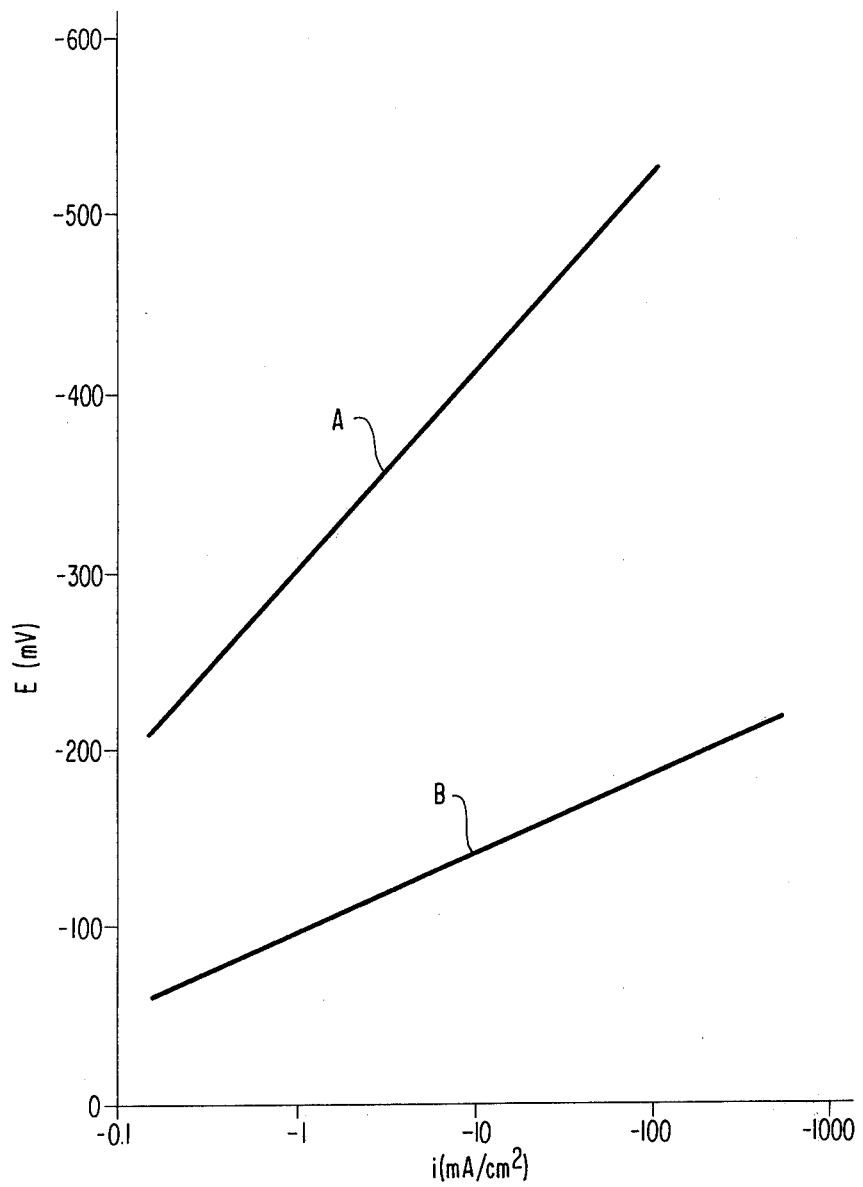

CATALYSTS FOR THE CATHODIC HYDROGEN DEVELOPMENT

This invention relates to catalysts for the cathodic liberation of hydrogen in alkaline electrolytes.

For cathodic hydrogen evolution, for example in electrolysis plants, electrodes of low hydrogen overvoltage are utilized, in order to keep the electrolytic voltage as low as possible. A suitable material for the electrode surface is nickel, which is greatly corrosion resistant in alkaline electrolytes. It is known that, as compared to smooth nickel, the hydrogen overvoltage can be further lowered considerably by the use of Raney nickel, on which the hydrogen separation is better catalyzed. However, considerable expenses are incurred in the processing of Raney nickel by the metallurgical process for producing the initial alloy, and due to the air sensitivity of the surface-enlarged catalyst.

It is an object of this invention to provide catalysts, a process for the manufacture thereof, as well as electrodes for hydrogen generation, which are simple and economical and wherein the hydrogen overvoltage, especially at high current densities, can compete with that of Raney nickel, but which are yet air-stable and shelf-stable.

This object is attained by depositing on a substrate metallic borides from an aqueous solution containing water-soluble boron-hydrogen compounds such as boranates (borohydrides) or borazanes (aminoboranes) and metallic ions, i.e., nickel ions, cobalt ions, or iron ions (or a mixture of these ions), suitably in the bivalent form, in the presence of a complexing agent for the metallic ions at temperatures of below 60°C and a free cation concentration of less than $10^{-10}$ mole/liter, thereby providing for the formation of X-ray-amorphous boride surfaces on the substrate. This results in catalysts containing one or several X-ray-amorphous compounds of boron with nickel, cobalt, or iron.

Such catalysts are eminently suitable for producing electrodes having a low hydrogen overvoltage, for example, by depositing borides without the use of current on suitable substrates or support structures. The support structures can consist of metallic or nonmetallic substances and can be in the configuration of sheets, nets, fibrous elements, sponges, or sintered ceramic components, or any other desired shape. Suitable are all materials having a catalytic effect for the deposition process. Such support materials can be determined by routine experiment. Among these materials, are, for example, almost all metals, e.g., Ni, Co, Cu, Fe, Cr and alloys of these metals, steel, brass, carbon elements and graphite, as well as sensitized synthetic resins e.g. polyamides, polypropylene, polyethylene, polyvinyl chloride, polystyrene, and polyesters. It will be appreciated that these resins are sensitized by applying active nuclei of Pd, Ag, Ni, etc. to the surface on which the metallic boride is to be deposited.

The borazanes or aminoboranes usually employed in accordance with this invention include:

diethyl borazane $(C_2H_5)_2NH \cdot BH_3$;
dimethyl borazane $(CH_3)_2NH \cdot BH_3$; and
trimethyl borazane $(CH_3)_3N \cdot BH_3$.

Other useful boron-hydrogen compounds include sodium tetrahydroborate ($NaBH_4$), also known as sodium borohydride, as well as the corresponding potassium compound.

The water-soluble metal salts used to provide the required metallic ions can be sulfates, chlorides, and acetates of nickel, cobalt and iron.

An essential factor for the production of the catalyst is that the borides are deposited on a substrate gradually and in a controlled process by the addition of a complexing agent for the metallic ions, such as ammonia, ethylenediamine, alkali metal tartrates, alkali metal citrates, etc., in contrast to precipitation from an uncomplexed metallic salt solution. The complexing tartrates and citrates are often the sodium and/or potassium salts.

The reason for this is that the catalysts, deposited in a controlled process, are stable in alkalis, in contrast to the borides precipitated in an "uncontrolled" manner, which have been suggested to serve as fuel cell catalysts. Another essential feature of the catalysts of this invention resides in that they are amorphous with respect to X-rays. In contrast, a thermal recrystallization until boride phases are formed which can be identified by roentgenography leads to an impairment of the catalytic activity for hydrogen deposition.

The gradual, controlled deposition can be regulated, with a given metallic ion and a given ion concentration, by the complexing agent and the temperature. The temperature is below 60°C. i.e., from about 10°C. to about 60°C. Preferably, normal room temperature is employed. Advantageously, a temperature of 20° to 50°C., especially 20° to 30°C. is utilized. In case of cobalt, higher temperatures can be suitable, unless the deposition process is conducted under the exclusion of oxygen, since in this case trivalent cobalt can be present which must first be reduced. The metallic ion, i.e., the Ni, Co, and Fe ions, can be present in the initial aqueous solution in an amount of from 0.02 to 0.2 mole/liter, preferably 0.05 to 0.1 mole/liter; and the complexing agent can be used in an amount of 1 to 10 equivalent/liter, particularly 1 to 5 eq./liter.

After the addition of the complexing agent, the free metallic ion concentration, i.e., the concentration of the uncomplexed metallic ion, is to be below $10^{-10}$ mole/liter, preferably $10^{-15}$ to $10^{-17}$ mole/liter.

The correlation between the complexing agent and the cation depends on the type of the two components and can readily be determined by preliminary experiments.

The maintenance of a free metal cation concentration of less than $10^{-10}$ mole/liter, preferably less than $10^{-15}$ mole/liter, makes it possible to deposit and/or grow the catalyst in a controlled process on support structures of metallic or nonmetallic substances. Besides, it is essential that the reaction solution does not contain any stabilizers, since otherwise a poisoning of the catalysts takes place with respect to their usefulness for the hydrogen evolution. The boron content of the thus-obtained X-ray-amorphous boride growth or layers deposited amounts to 5 to 8 percent by weight. When the value drops below the lower limit, an undesired crystallinity is observed, while when the upper limit is exceeded, the catalytic properties suffer. The density of the boride deposits or growths is about 8 g./cm$^3$ and the specific resistance is 1 to 2 $\frac{\text{ohm} \cdot \text{mm}^2}{\text{m}}$ The formation of the boron alloy, i.e. the boride, takes place with the consumption of hydroxyl ions. When using sodium borohydride as a reducing agent, i.e. as the boron-hydrogen compound, the reaction is preferably carried out in ammoniacal or caustic alkali baths. When using aminoboranes, buffered baths are employed, so that a pH of from 5 to 7, suitably around about 6, is maintained.

Depositing speeds, expressed by the growth per unit time on smooth surfaces, of 0.1 to 10 $\mu$/hour, especially 0.1 to 1.5 $\mu$/h. are advantageous. Speeds of 0.2 to 0.5 $\mu$/h. are especially preferred.

The catalysts of this invention are far superior to smooth nickel or also sintered nickel with respect to their catalytic activity. Their activity — as mentioned above — is comparable to that of Raney nickel, without exhibiting the sensitivity of Raney nickel. Thus, the novel catalysts can also be readily handled as such; they are shelf-stable and can be transported.

In the appended drawing, the behavior of a catalyst of this invention has been compared with that of smooth nickel sheet.

The FIGURE shows, in the usual semilogarithmic representation, the calculated straight line of the hydrogen evolution in 6-molar potassium hydroxide solution at 20°C. on a smooth nickel sheet (curve A) and, on the same nickel sheet, after the current-less deposition of a nickel boride layer having a thickness of 5 microns (curve B). The process for forming the layer is described hereinafter in greater detail. The geometric surface in both cases is approximately equal to the true surface.

It can be seen that the slope of the calculated straight line with respect to the nickel boride with about 45 millivolts per current decade is considerably lower than the normal slope of 110 millivolts/decade on smooth nickel sheet. Thereby, the advantage of the nickel boride layer becomes especially great in case of high current densities and renders the catalysts of this invention and the electrodes obtained with the use of this catalyst competitive with even platinum and Raney nickel catalysts and electrodes catalyzed therewith.

The catalyst layer can be formed, by a suitable choice of deposition conditions, to be smooth or rough up to a moss-like form of deposition. The low expenditure in process technology and the extremely economical consumption of material due to the small required layer thickness are additional great advantages of the electrodes of this invention. The manufacturing process can be executed continuously without any difficulties.

A smooth deposition is obtained at temperatures of below 60°C., minor concentrations of metallic ions, as mentioned above, and a suitable adjustment of the concentration of free metallic ion by the concentration of complexing agent. A moss-like deposition is not preferred, because it adheres poorly. In order to increase the surface area of the catalyst, it has proved to be advantageous to employ a rough, porous, or sponge-like substrate (e.g. a sintered element or a net) and to deposit a smooth layer thereon.

Among the complexing agents, ammonia is especially preferred, because it permits a very good adjustment of the system. Since ammonia evaporates, the process can be effected at room temperature under good control of the bath.

It is essential to add a sufficient amount of reducing agents, so that practically equimolar quantities are employed, taking the above description into account. The thus-produced deposits show analytical values adding up to 100 percent. Thus, pure nickel borides are involved which do not contain any undefinable secondary products.

The field of application of the electrodes of this invention extends to all processes wherein a decomposition of water is to be accomplished by external or internal electrolysis. In case of an external electrolysis, i.e., when supplying current by external current sources, the electrodes of this invention can be used as cathodes in water electrolysis plants and as auxiliary electrodes in secondary battaries, wherein a hydrogen evolution is desirable or necessary, for example, for reducing the degree of charging efficiency of the negative storage electrode. In case of an internal electrolysis, i.e., short-circuit of the electrode with an electrode of a more negative potential in a galvanic cell, the electrodes of this invention can likewise serve for reducing the degree of charging efficiency in secondary batteries.

The following examples will explain the invention:

EXAMPLE 1

A nickel net having a mesh width of 1 mm. is suspended, after careful purification and degreasing, in a deposition bath made up of an aqueous solution of 30 g./l. of $NiCl_2 \cdot 6H_2O$, 100 g./l. of $NH_3$, and 3 g./l. of $NaBH_4$. The deposition of the catalyst commences at room temperature after a few minutes under moderate liberation of hydrogen. The layer grows at a rate of about 0.3 microns/hour. The growth process, which may be continued for 3 to 10 hours was in the present example, for about 5 hours to provide a layer of 1.8 microns containing 7 percent boron. The growth of catalysts is dense, smooth and has a dark luster. The concentration of free metal ions, i.e., Ni was $10^{-15}$ mole/liter. The current-voltage characteristic for the cathodic hydrogen evolution in 6-molar potassium hydroxide solution at 20°C. is represented by curve B in the drawings.

EXAMPLE 2

Under a protective gas atmosphere of nitrogen, a carefully purified copper net is suspended in a deposition bath made up of an aqueous solution of 32g./l. of $CoSO_4 \cdot 6H_2O$, 100 g./l. of $NH_3$, and 3 g./l. of $NaBH_4$. The deposition reaction is conducted at 45°C. for 30 minutes to provide a layer of 5 micron thickness at a rate of 10$\mu$/hr. The concentration of free metal ions was $10^{-12}$ mole/liter. The current-voltage characteristic obtained for the layer for the hydrogen liberation in 6-molar potassium hydroxide solution is completely analogous to that of the nickel boride layer disclosed in Example 1.

EXAMPLE 3

By following the procedure set forth in Example 1, additional catalyst layers were deposited on various substrates. The conditions, substrates, and reactants are summarized below:

| SUBSTRATES | METAL SALT | BORON COMPOUND | COMPLEXING AGENT | TEMP.°C. | CONC.-FREE METAL IONS (Moles/Liter) | BORIDE LAYER OBTAINED |
| --- | --- | --- | --- | --- | --- | --- |
| Brass | $NiCl_3$ | $NaBH_4$ | Ethylenediamine | 45 | $10^{-12}$ | $5\mu$ |
| Nickel | $NiSO_4$ | $(CH_3)_2NH.BH_3$ | Sodium Citrate | 50 | $10^{-12}$ | $4\mu$ |
| Nickel | $FeSO_4$ | $NaBH_4$ | Sodium Tartrate Ammonia | 50 | $10^{-15}$ | $1\mu$ |
| Stainless Steel | $Co(CH_3COO)_2$ | $K BH_4$ | Sodium Potassium Tartrate | 45 | $10^{-15}$ | $5\mu$ |
| Polypropylene | NiCl 2-5 parts CoCl 2-1 part | $NaBH_4$ | Ammonia | 30 | $10^{-13}$ | $5\mu$ Ni 1 part Co 2 parts |

While the novel principles of the invention have been described, it will be understood that various omissions, modifications and changes in these principles may be made by one skilled in the art without departing from the spirit and scope of the invention.

I claim:

1. A process for the production of catalysts for the cathodic hydrogen evolution in alkaline electrolytes, which comprises growing onto surfaces suitable as an electrode base an X-ray amorphous metallic boride compound of nickel, cobalt or iron containing 5 to 8 percent by weight of boron by a reducing deposition in an aqueous solution at a temperature of below 60°C., said solution initially consisting essentially of water, metallic ions selected from the group consisting of nickel ions, cobalt ions and iron ions in an amount of from 0.02 to 0.2 mole/liter, a complexing agent for the metallic ions in a concentration of from 1 to 10 mole/liter and water-soluble boranate or borazane as reducing agent in a concentration of from 0.02 to 0.2 mole/liter, said solution having a concentration of free metallic ion of below $10^{-10}$ mole/liter during said growth.

2. The process according to claim 1, wherein the deposition rate is controlled by the type and concentration of the complexing agent, as well as by the bath temperature.

3. The process according to claim 1, wherein the concentration of free metallic ion is $10^{-12}$ to $10^{-17}$ mole/liter.

4. The process according to claim 1, wherein the concentration of free metallic ion, when using ammonia as the complexing agent, is $10^{-15}$ to $10^{-17}$ mole/liter.

5. The process according to claim 1, wherein metallic ion concentration is 0.1 to 0.15 mole/liter; the boranate or borazane concentration is 0.05 to 0.1 mole/liter; and the concentration of complexing agent is 1 to 5 mole/liters in the aqueous solution.

6. The process according to claim 5, wherein the complexing agent concentration is from 1 to 10 equivalents/liters and especially 1 to 5 equivalents/liter.

7. The process according to claim 1, wherein the reducing deposition takes place directly onto the surfaces of a support structure of a metallic net or skeleton of metallic fibers.

8. The process according to claim 1, wherein the reducing deposition takes place onto the surfaces of a support structure of a porous dielectric substance.

9. The process according to claim 1, wherein sodium borohydride is the reducing agent, and deposition is carried out in ammoniacal or caustic alkali solutions.

10. The process according to claim 1, wherein when using borazanes, the deposition takes place in buffered baths at a pH of between 5 and 7.

11. The process according to claim 1, wherein the deposition speed, expressed by the accumulated growth per time unit onto smooth surfaces, is 0.1 − $10\mu$/hour.

12. The process according to claim 11, wherein the deposition speed is 0.2 to $0.5\mu$/hour.

13. The process according to claim 1, wherein the growth takes place from a stabilizer-free solution.

14. Catalysts for the cathodic hydrogen evolution in alkaline electrolytes, produced according to a process of claim 1, which comprises a layer deposit containing one or more X-ray-amorphous compounds of boron with nickel, cobalt, or iron on the surfaces of a supporting structure.

15. Catalysts according to claim 14, wherein said layer is on a supporting structure of a metallic net, a metallic fiber skeleton or a porous dielectric substance.

16. Catalysts according to claim 14, wherein said layer has a density of about 8 g./cm$^3$ and a specific resistance of $$1 - 2 \; \frac{\text{ohm/mm}^2}{\text{m}}$$

17. Catalysts according to claim 14, wherein said layer is deposited from a solution which does not contain any stabilizers.

18. The process according to claim 1, wherein when using borazanes, the deposition takes place in buffered baths at a pH of about 6.

19. The process according to claim 1, wherein the deposition speed, expressed by the accumulated growth per time unit onto smooth surface is 0.1 to $1.5\mu$/hour.

* * * * *